March 16, 1937. W. A. WISSLER 2,074,007
METHOD OF MAKING ARTICLES OF COBALT-CHROMIUM-TUNGSTEN ALLOYS
Filed Aug. 3, 1934
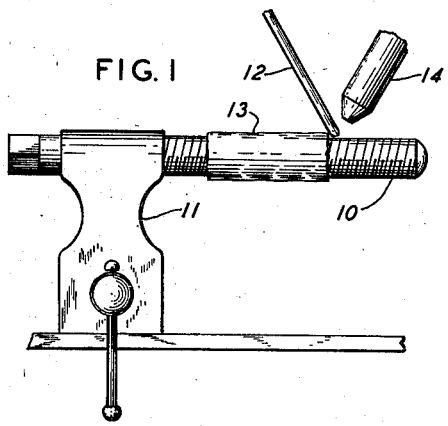
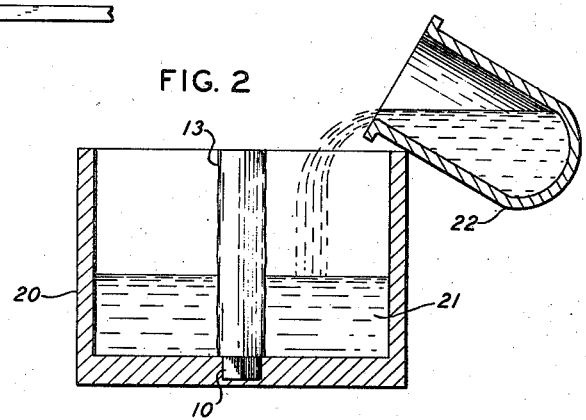
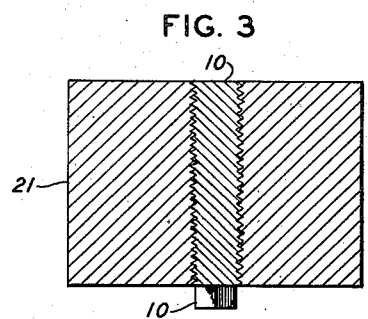
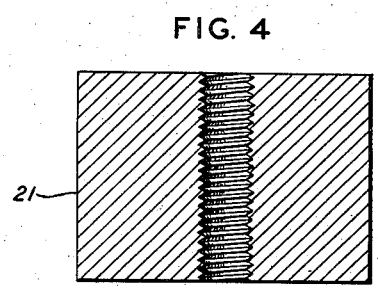
INVENTOR
WILLIAM A. WISSLER
BY
ATTORNEY Patented Mar. 16, 1937

2,074,007

UNITED STATES PATENT OFFICE 2,074,007

METHOD OF MAKING ARTICLES OF COBALT-CHROMIUM-TUNGSTEN ALLOYS

William A. Wissler, Flushing, N. Y., assignor, by mesne assignments, to Union Carbide and Carbon Corporation, a corporation of New York Application August 3, 1934, Serial No. 738,213

3 Claims. (Cl. 113—112)

Alloys of the cobalt-chromium-tungsten type described in U. S. Patent 1,057,423 issued to Elwood Haynes, and more recent modifications thereof, are extensively used for articles designed to resist wear, abrasion, or corrosion. Such alloys are practically unmachinable and articles made therefrom must be finished to size by grinding. It is difficult and often impossible by ordinary methods to make threaded holes or holes of odd shapes such as squares, tapers, or special dies, in articles composed of these alloys.

The present invention has for its object a method of making articles composed at least in part of acid-resistant, difficultly machinable alloy of the cobalt-chromium-tungsten type, the alloy part of the article having one or more shaped holes.

The method of the invention comprises depositing the desired alloy of the cobalt-chromium-tungsten type by welding methods upon an acid-soluble metal core which is preformed to the desired size and shape of the hole. Subsequently, the metal piece is dissolved, leaving the desired hole.

The welding procedure should be such that the metal core is not fused to any substantial depth and that the interalloying between the core and the deposited alloy is only slight. It is also essential that the core be of such a nature that the molten cobalt-chromium-tungsten alloy will wet it and flow on smoothly. These conditions may be fulfilled by using a steel core and by welding with a reducing oxyacetylene flame. Fused borax is a particularly effective flux.

The deposited cobalt-chromium-tungsten alloy may be built up by welding or casting the same or a different metal onto the deposit so as to impart to the article the desired size and shape.

The process of the invention is illustrated pictorially in the accompanying drawing, Figures 1, 2, 3, and 4.

As shown in Figure 1, an acid-soluble metal piece 10, preformed to the shape and dimensions of the desired hole, is positioned for welding, for instance in a vise 11, and cobalt-chromium-tungsten type alloy 13 is deposited on the said piece 10 from a welding rod 12 by fusion of the rod 12 with a heat-source, for example a welding torch 14.

The metal piece 10 coated with alloy 13, may then be positioned, as shown in Figure 2, within a mold 20, and molten cobalt-chromium-tungsten metal 21 may be poured from a suitable container 22 into the mold 20 around the alloy 13. When the contents of the mold 20 have cooled, a solid, cored article, as shown in Figure 3, results. If the cored article is now placed in acid, the acid-soluble core 10 is removed by the acid and the acid-resistant cobalt-chromium-tungsten alloy body 21 remains, resulting in the desired object as shown in Figure 4.

I claim:

1. Method of making articles composed at least in part of acid-resistant, unmachinable cobalt-chromium-tungsten type alloy and provided in said part with one or more shaped holes, which comprises depositing said alloy by welding methods upon an acid-soluble metal core preformed to the desired shape of the hole, and thereafter dissolving said metal core.

2. Method of making articles composed at least in part of acid-resistant, unmachinable cobalt-chromium-tungsten type alloy and provided in said part with one or more shaped holes, which comprises depositing said alloy by welding methods upon an acid-soluble metal core preformed to the desired shape of the hole, the said metal core not being fused to any substantial depth during the welding operation, and thereafter dissolving said metal core.

3. Method of making articles composed at least in part of acid-resistant, unmachinable cobalt-chromium-tungsten type alloy and provided in said part with one or more shaped holes, which comprises depositing said alloy by reducing-flame oxyacetylene welding methods upon an acid-soluble metal core preformed to the desired shape of the hole, and thereafter dissolving said metal core in said acid.

WILLIAM A. WISSLER.